Figure 1:
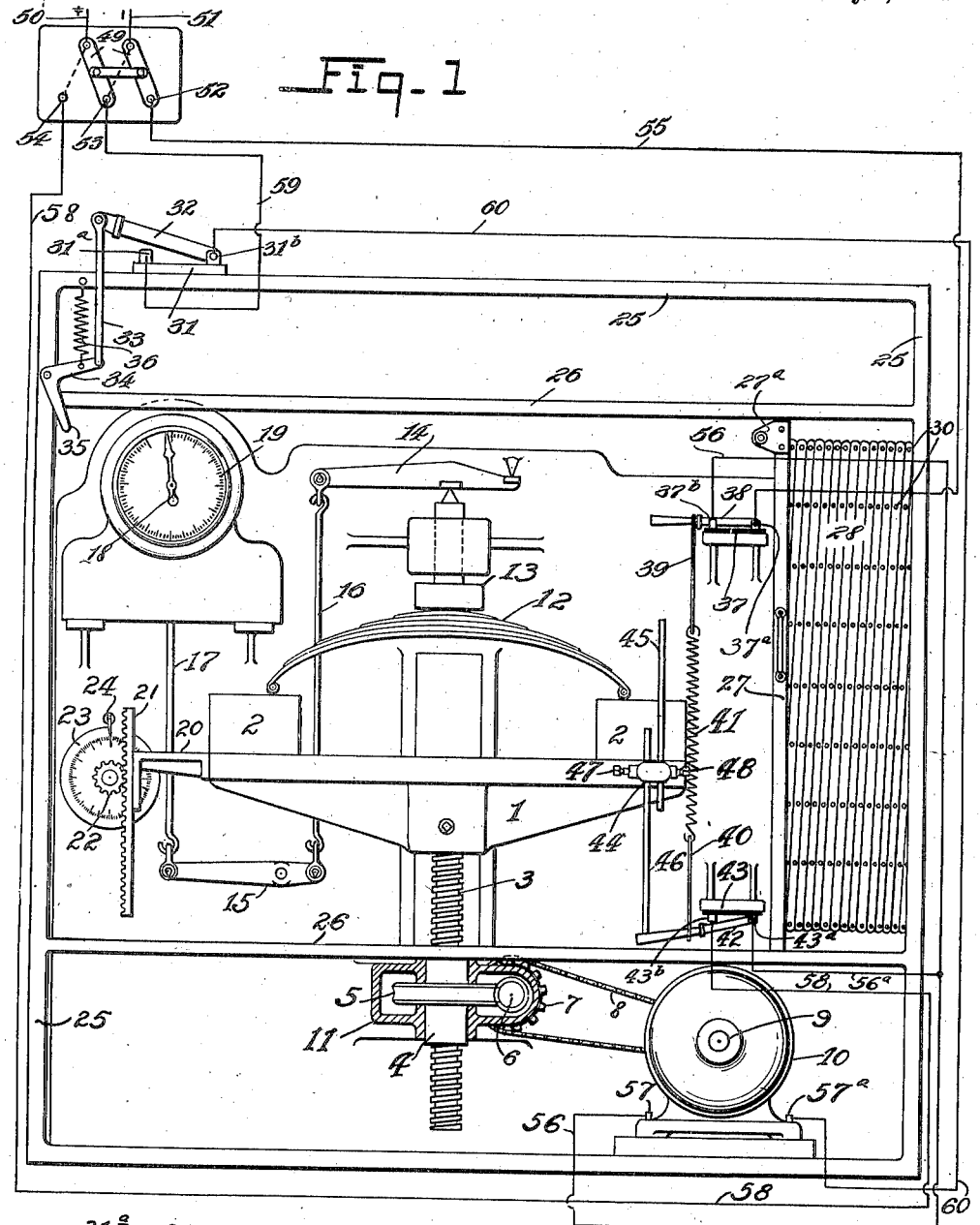

C. GIRL.
SPRING TESTING MACHINE.
APPLICATION FILED JUNE 24, 1915.

1,308,410.

Patented July 1, 1919.

Inventor
Christian Girl,
By Hull, Smith, Brock & West
Attys.

UNITED STATES PATENT OFFICE.

CHRISTIAN GIRL, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

SPRING-TESTING MACHINE.

1,308,410.      Specification of Letters Patent.      Patented July 1, 1919.

Application filed June 24, 1915. Serial No. 36,042.

*To all whom it may concern:*

Be it known that I, CHRISTIAN GIRL, a citizen of the United States, residing at Cleveland, in the county of Cuyahoga and State of Ohio, have invented a certain new and useful Improvement in Spring-Testing Machines, of which the following is a full, clear, and exact description, reference being had to the accompanying drawings.

This invention relates to testing machines, and more particularly to safety appliances for such machines whereby it will be impossible for the operator to be injured by the flying of particles caused by the breaking or rupture of the articles under test. The machine, which is shown more or less diagrammatically herein, and the safety appliance therefor are shown as employed in the spring-making art; but it will be obvious that the machine, and much more the safety protecting devices associated therewith, may be employed in other arts than the specific one indicated by the drawing.

Figure 2:
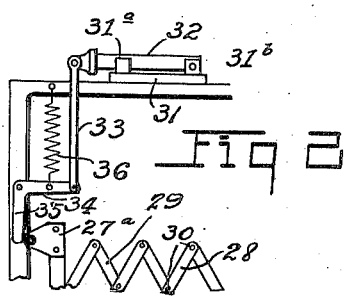

It is the general object of the invention to provide a testing machine with an improved type of protecting device whereby danger of injuring the operator will be reduced to a minimum. Other and more limited objects of the invention will appear hereinafter and will be embodied in the claims hereto annexed and illustrated, in one form, in the drawings constituting part hereof, wherein Figure 1 represents a somewhat diagrammatic elevation of a testing machine having my invention applied thereto; and Fig. 2 is a detail in elevation of part of the safety gate and the coöperating electric switch which is controlled thereby.

Describing by reference characters the various parts illustrated in the drawings, 1 denotes the movable supporting table of a testing machine of standard construction having the supporting blocks 2 whereon the ends of a spring (or other article to be tested) may be supported. The table 1 is carried by a screw 3 on which is mounted a nut 4 having a worm gear 5 rigid therewith meshing with a worm 6 provided with a sprocket 7 driven by a chain 8 from a pinion (not shown) on the armature shaft 9 of an electric motor, indicated generally at 10, of any approved construction. The nut, worm, and worm gear are inclosed within a housing 11. The article to be tested—shown as a spring 12—is adapted to bear against a scale head 13 which operates—through suitably arranged levers 14 and 15, links 16 and 17, and other necessary connections—the index finger 18 of a scale, which may be provided with graduations 19 to indicate in pounds or other suitable units the pressure transmitted to the tested article.

The table 1 is also shown as provided with an extension 20 carrying a rack 21 meshing with a pinion 22 and operating to rotate a scale 23 with reference to an index finger 24 thereby to indicate the deflection of the tested article in inches or other convenient unit of linear measurement. The testing machine will be inclosed within a cage, which may be bounded by rails 25. Intermediate the top and bottom of the cage are a pair of slideways 26 for the post 27 of an extensible and collapsible gate, said gate comprising an inner and an outer series of reversely extending diagonal plates 28, 29, said plates being pivotally connected, as indicated at 30. When the gate is closed, it affords a meshed protecting device which will be interposed between the operator and the mechanism and the articles within the cage.

The testing machine, the means for driving the same, and the indicating devices associated therewith are of any standard or approved construction; and hence further detailed description or illustration of the same will be unnecessary.

The circuits for operating and reversing the motor and for automatically cutting off the motor under varying conditions will now be described. 31 denotes the base of a switch of the knife-blade type, the blade which opens and closes the switch circuit being indicated at 32. This blade is connected by a link 33 to one arm 34 of an angle lever which is pivotally connected to one of the side rails 25 with its other arm 35 projecting into the opening of the cage and in position to be engaged by the projection 27$^a$ on the top of the sliding post of the extensible gate, thereby to rock the lever against the action of the spring 36 to close the switch—the spring tending to open the switch. 37 denotes the base and 38 the blade of another switch, the blade being connected by means of links 39, 40 and an interposed spring 41 to the blade 42 of another switch, the base whereof is indicated at 43. 44 denotes a suitable post carried by the table 1 and having adjustably mounted therein a pair of rods 45, 46 which are adapted respectively to engage the end of the blade 38 and the end of the blade 42, said post being provided with set screws 47, 48 for said rods, respectively. 49 denotes the connected branches of a reversing switch, each of said branches being pivoted and the branches being connected at their pivoted ends with line wires 50 and 51, respectively. Their free or swinging ends coöperate with three contacts, indicated at 52, 53 and 54. From the contact 52 a wire 55 extends to one of the contacts 37$^a$ of the switch base 37. From the other contact 37$^b$ of said switch base a wire 56 extends to one of the terminals 57 of the motor, while a branch 56$^a$ of the same wire 56 extends to one of the contacts 43$^a$ of the switch base 43. From the other contact 43$^b$ of said switch base the wire 58 extends to the contact 54. From the contact 53 a wire 59 leads to the contact 31$^a$ of the switch base 31. From the other contact 31$^b$ of said base a wire 60 extends to the other terminal 57$^a$ of the motor.

With the parts and circuits arranged as described, the operation will be as follows: The rods 44 and 46 will be adjusted so as to open their corresponding switch blades 38 and 42 when the table shall have reached its predetermined upper and lower limits, respectively. For instance, assuming that the spring 12 is to be tested and it is desired to deflect the same until the central portion is below the ends thereof, the distance between the top of the rod 45 and the switch blade 38 will be sufficient to allow this deflection. On the other hand, it is not desirable or necessary to run the table 1 downwardly to any material extent after the pressure shall have been removed from the spring; and the rod 46 will be set so as to open the switch blade 42 and thereby open the motor circuit when this result is secured. When the gate is open, the circuit will be broken at the contact 31$^a$ by the action of the spring 36, irrespective of which of the switch blades 38 and 42 is closed and irrespective of the position of the reversing switch blades 49.

Assuming that the full-line position of the switch blades 49 is the position for driving the motor in a direction to move the table upwardly, the operator must first close the gate before the motor circuit can be closed, since said circuit includes the switch 31, 32. When this gate is closed, the circuit is through the wire 59, switch blade 32, wire 60, through the motor, wire 56, switch blade 38, and wire 55. The motor will elevate the table until the rod 45 lifts the switch blade 38 out of engagement with the contact 37$^b$. This will cause the switch blade 42 to close the circuit at its switch, but the table cannot be retracted until the operator swings the reversing switch to the dotted line position whereupon the circuit will be through the wire 58, contact 43$^b$, switch blade 42, wire 56$^a$, wire 56 to the terminal 57, through the motor and through the wire 60 to the switch 31, 32, through said switch and the wire 59 back to the reversing switch contact 53. This will cause the motor to be reversed and the table to be retracted until the rod 46 engages the switch blade 42 to break the circuit at its switch. The spring 41 will act to close the circuit at the switch 37, 38, and this switch will be ready for the next reversal of the motor. Meanwhile, however, the motor cannot be again reversed until the switch branches 49 are operated. This operation of driving the table in reverse directions may be repeated as often as desirable or necessary. However, immediately upon opening the protecting gate, the motor circuit—whatever may be the position of the reversing switch and whichever of the switches 37, 38 or 42, 43 may be closed—will be broken.

For convenience of description, the movable protecting member which is interposed between the tested article and the operator will be referred to as a "gate"; but by the use of this term I do not preclude myself from the application of my invention to closures or movable protecting devices other than gates.

Having thus described my invention, what I claim is:

1. The combination, with a testing machine comprising a movable part, of a safety gate for said machine, and adjustable means for driving said movable part in reverse directions, said means including a normally-open electric circuit, and means controlled by the closing of the gate to close said circuit.

2. The combination, with a testing machine comprising a movable part, of means including an electric circuit for driving said part in reverse directions, said circuit including a manually operated reversing switch in front of said machine, a pair of switches adapted and arranged to be alternately opened and closed through the movement of said movable part, a normally open switch, and a safety gate for the front of said machine adapted and arranged to close the last mentioned switch when the gate is in substantially closed position.

3. The combination, with a testing machine comprising a movable part, of means including an electric circuit for driving said part in reverse directions, said circuit including a reversing switch and a normally open switch in front of said machine, and a safety gate adapted and arranged to close the last mentioned switch when the said gate is in substantially closed position.

4. The combination, with a testing machine comprising a reciprocable part, of a safety gate for said machine, means including a controlling device for driving said part in reverse directions, and means normally rendering such driving means inoperative and arranged to be engaged by the gate when the latter is in a substantially closed position thereby to render the driving means operative.

5. The combination, with a testing machine, of means for operating said machine, a protecting gate for said machine, and connections whereby the operating means shall be inoperative while the gate is open.

6. The combination, with a testing machine, of means for driving the same in one direction, means for reversing such drive, a movable safety gate in front of said machine, and connections operative by the movement of said gate whereby the machine may be driven in neither direction without closing said gate.

7. The combination, with a testing machine, of a protecting gate therefor, an electric circuit for operating said machine, a switch in said circuit, means tending to open said switch, and means whereby said switch will be closed against the action of the opening means by the closing of the gate.

8. The combination, with a testing machine, of an electric circuit for operating said machine in reverse directions, a reversing switch controlling said circuit, means cooperating with said switch and said machine whereby the movement of said machine may be reversed, a normally open switch in said circuit, and a protecting gate for said machine adapted and arranged, when closed, to automatically close the last mentioned switch.

9. The combination, with a testing machine, of an electric motor for operating the same in reverse directions, an electric circuit including said motor, a pair of switches in said circuit, means adjustably connected to the said machine for opening said switches alternately, a reversing switch in said circuit, and a fourth switch in said circuit, a protecting gate for said machine, and connections whereby the closing of said gate will close the last mentioned switch and the opening of said gate will open the same.

10. The combination, with a testing machine comprising a movable part, of means for driving said part, means for reversing the direction of such drive, the last mentioned means including devices adjustably connected with said movable part for reversing such drive when the movable part shall have traveled a predetermined distance in either direction, a safety gate for said machine, and connections whereby the driving means shall be inoperative when said gate is in other than substantially closed position.

11. The combination, with a testing machine comprising a movable part, of means including an electric circuit for driving said part in reverse directions, a pair of switches in said circuit, means connecting said switches whereby the opening of one switch will close the other, means adjustably connected with said movable part for engaging each switch thereby to open one switch and close the connected switch when the movable part shall have traveled a predetermined distance in either direction, a safety gate for said machine, and a normally open switch in said circuit arranged to be closed by moving the gate to substantially closed position.

In testimony whereof, I hereunto affix my signature in the presence of two witnesses.

CHRISTIAN GIRL.

Witnesses:
 HUGH B. McGILL,
 J. B. HULL.